(12) United States Patent
Chen et al.

(10) Patent No.: US 8,829,752 B2
(45) Date of Patent: Sep. 9, 2014

(54) SYNCHRONOUS PERMANENT MAGNET MACHINE

(75) Inventors: Jin-tao Chen, Sheffield (GB); Zi-Qiang Zhu, Sheffield (GB)

(73) Assignee: Siemens Aktiengesellschaft, Munich (DE)

( * ) Notice: Subject to any disclaimer, the term of this patent is extended or adjusted under 35 U.S.C. 154(b) by 84 days.

(21) Appl. No.: 13/448,444

(22) Filed: Apr. 17, 2012

(65) Prior Publication Data

US 2012/0313473 A1 Dec. 13, 2012

(30) Foreign Application Priority Data

Apr. 18, 2011 (EP) ...................................... 11162813

(51) Int. Cl.
   *H02K 21/12* (2006.01)
   *H02K 1/27* (2006.01)
   *H02K 29/03* (2006.01)

(52) U.S. Cl.
   CPC .................. *H02K 21/12* (2013.01); *H02K 1/27* (2013.01); *H02K 29/03* (2013.01)
   USPC ............. 310/156.07; 310/156.43; 310/156.44

(58) Field of Classification Search
   USPC ............. 310/156.07, 156.43–156.46, 156.38
   See application file for complete search history.

(56) References Cited

U.S. PATENT DOCUMENTS

| 4,217,508 | A  | * | 8/1980  | Uzuka ............................. 310/46 |
| 6,703,743 | B2 | * | 3/2004  | Kaneko et al. ........... 310/156.38 |
| 8,400,038 | B2 | * | 3/2013  | Smith et al. .............. 310/156.07 |
| 2006/0113857 | A1 | * | 6/2006  | Honkura et al. ......... 310/156.43 |
| 2006/0220484 | A1 | * | 10/2006 | Stephens .................. 310/156.43 |

FOREIGN PATENT DOCUMENTS

| EP | 1816725 A1 | 8/2007 |
| JP | 2005044820 A | 2/2005 |
| WO | WO 8300264 A1 | 1/1983 |

OTHER PUBLICATIONS

A. H. Isfahani, S. Vaez-Zadeh, M. A. Rahman: "Using Modular Poles for Shape Optimization of Flux Density Distribution in Permanent-Magnet Machines", IEEE Transactions on Magnetics, vol. 44, No. 8, Aug. 2008, pp. 2009 to 2015; Others.
European Search Report, Oct. 6, 2011, pp. 1-11.

\* cited by examiner

*Primary Examiner* — Dang Le

(57) ABSTRACT

A synchronous permanent magnet machine includes a permanent magnet arrangement for producing a magnetic field having a flux density distribution that is approximately sinusoidal. The permanent magnet arrangement includes a permanent magnet pole with both low and high energy-product magnets. The permanent magnet pole includes a low energy-product magnet and a high energy-product magnet which have different directions of magnetization, or a disposition of low/high energy-product magnets within the permanent magnet pole is asymmetric with respect to the central region of the permanent magnet pole.

10 Claims, 8 Drawing Sheets

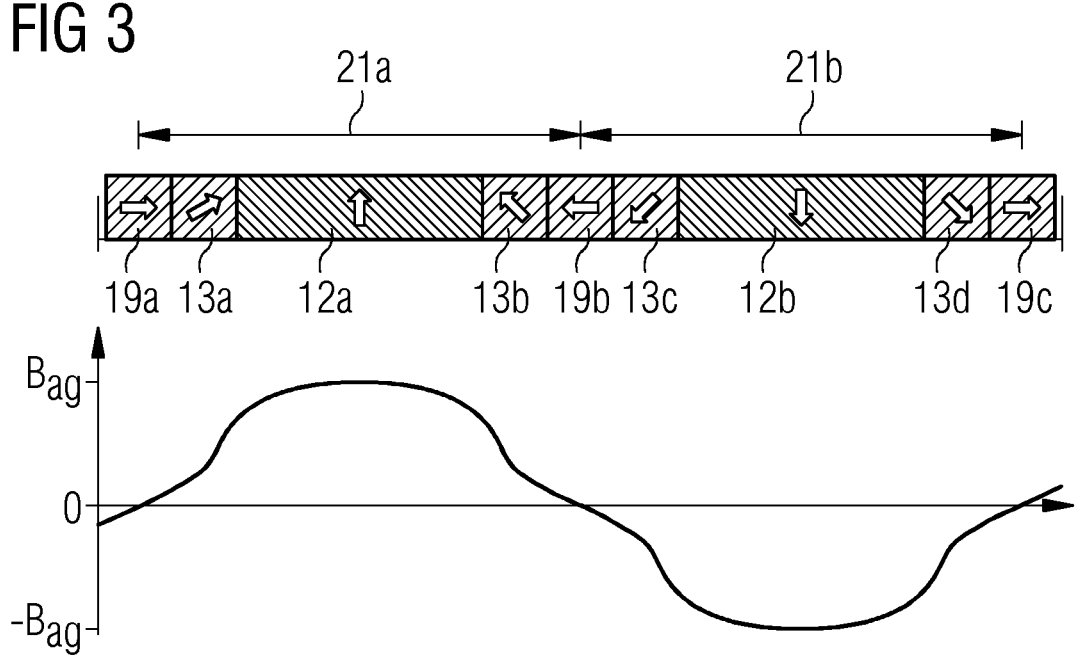
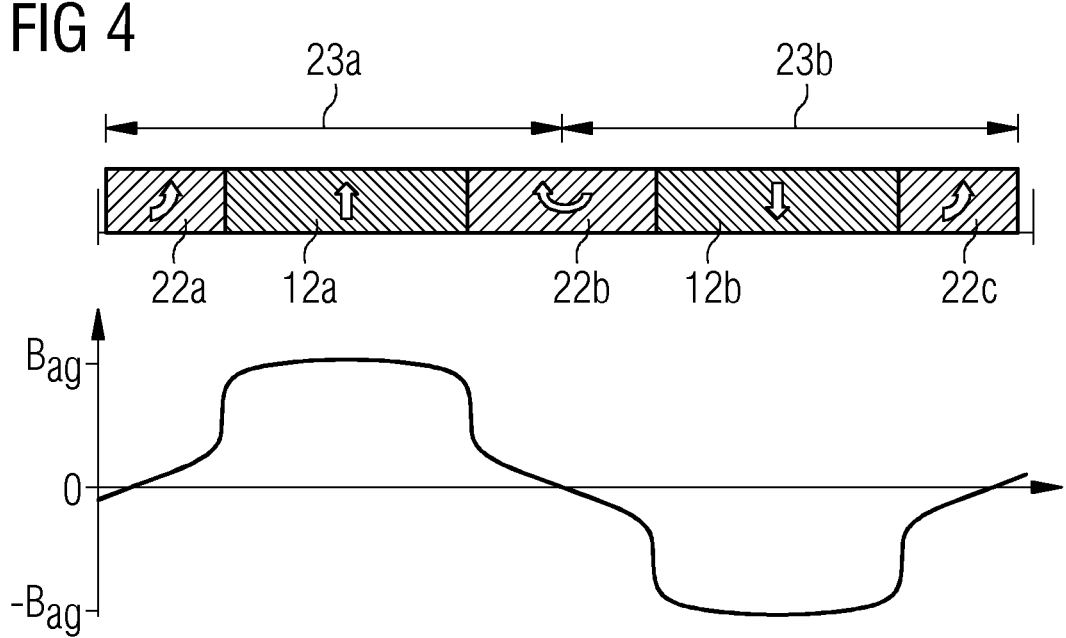

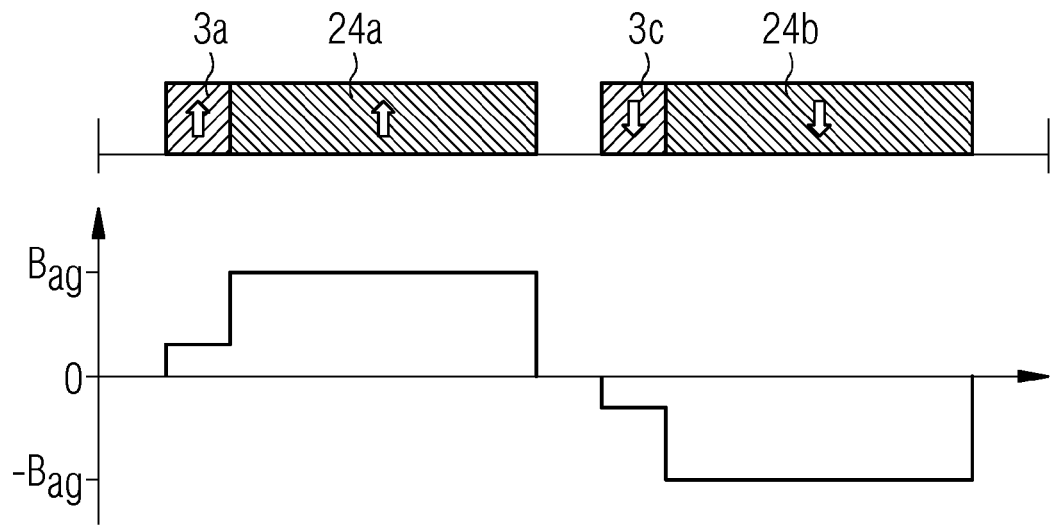
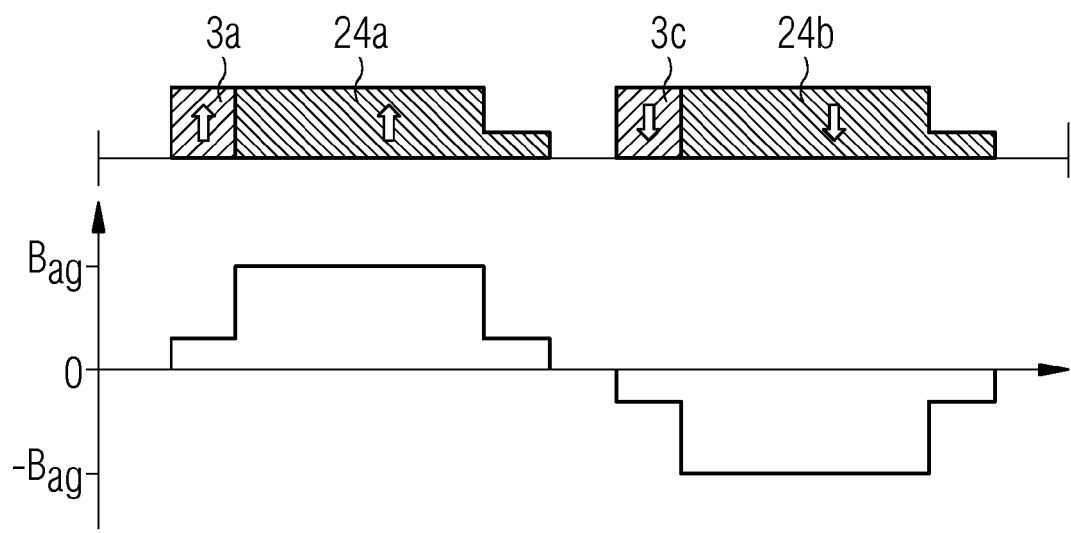

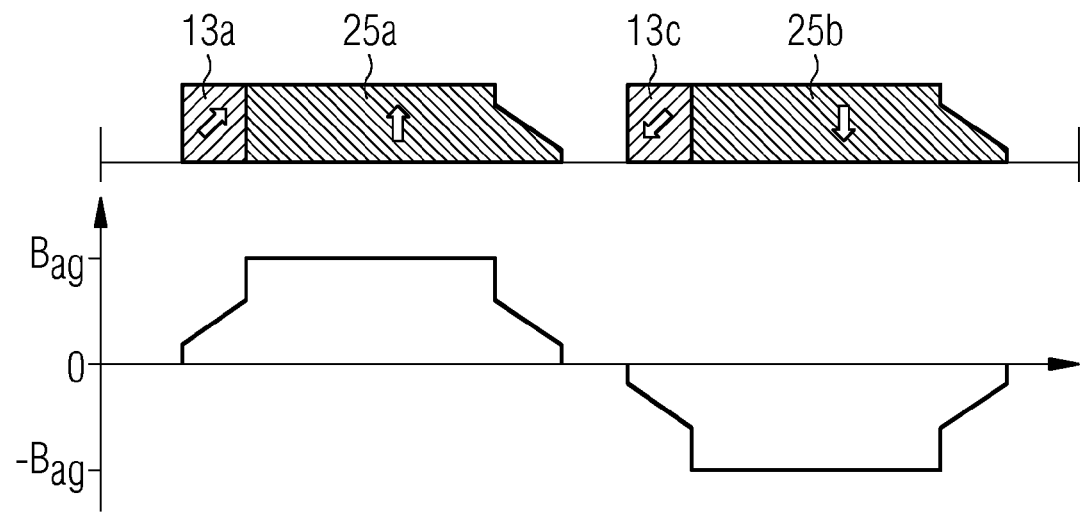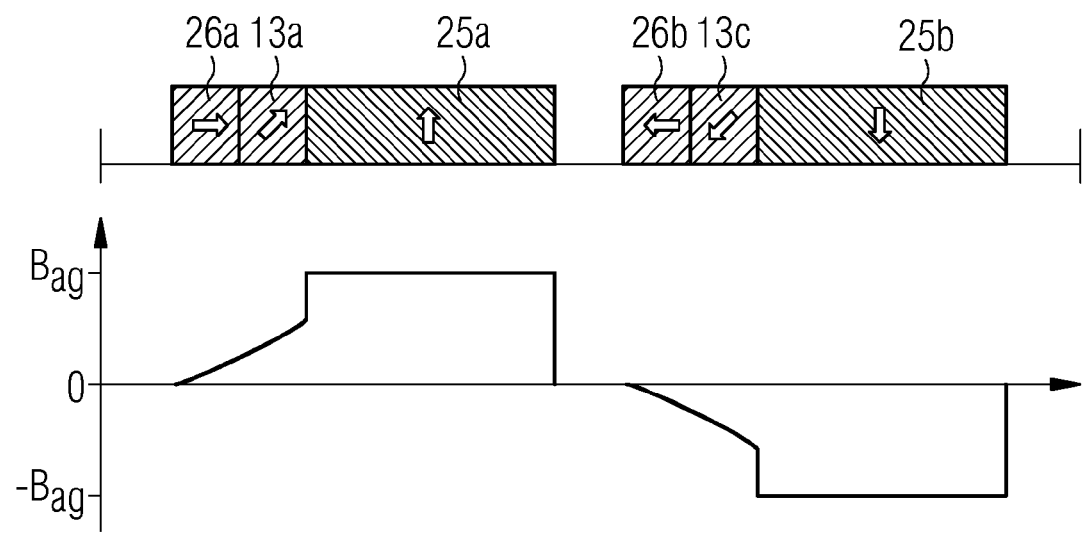

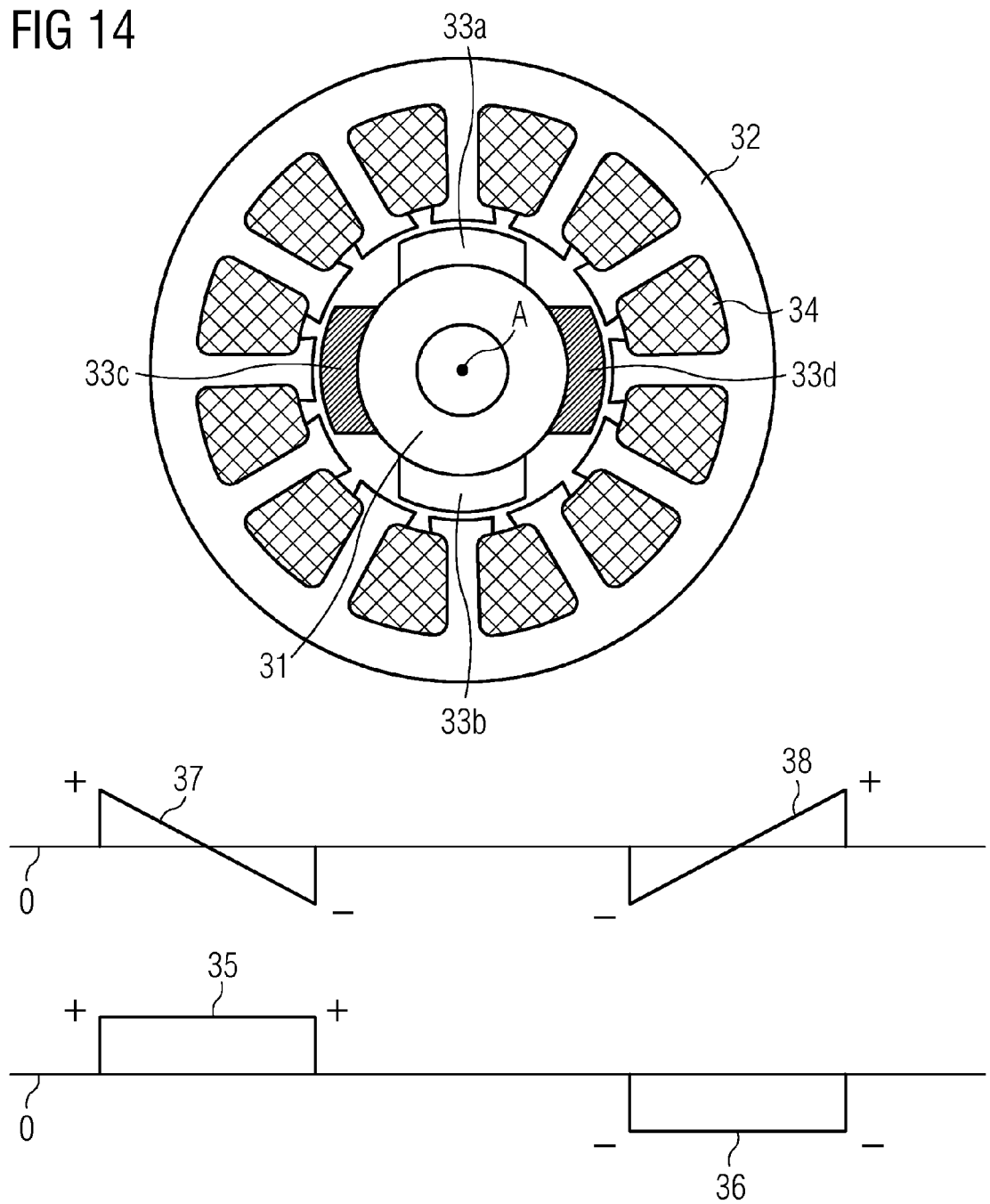

SYNCHRONOUS PERMANENT MAGNET MACHINE

CROSS REFERENCE TO RELATED APPLICATIONS

This application claims priority of European Patent Office Application No. 11162813.7 EP filed Apr. 18, 2011. All of the applications are incorporated by reference herein in their entirety.

FIELD OF INVENTION

A synchronous permanent magnet machine is provided. More particularly, a synchronous permanent magnet machine is provided, which includes a permanent magnet arrangement for producing a magnetic field having a flux density distribution that is approximately sinusoidal, the permanent magnet arrangement including a permanent magnet pole having a base, top face, sides, and a central region midway between the sides and extending between the base and top face, the permanent magnet pole being made up of both low and high energy-product magnets. An example of a low energy-product magnet is ferrite. Examples of high energy-product magnets are Neodymium-Iron-Boron and Samarium-Cobalt.

BACKGROUND OF INVENTION

One such permanent magnet arrangement is disclosed in the following publication: IEEE Transactions on Magnetics, Vol. 44, No. 8, August 2008, pages 2009 to 2015, Using Modular Poles for Shape Optimization of Flux Density Distribution in Permanent-Magnet Machines, A. H. Isfahani, S. Vaez-Zadeh, and M. A. Rahman.

This permanent magnet arrangement is shown in FIG. 1 of the accompanying drawings. FIG. 1 also shows schematically the flux density distribution of the magnetic field produced by the arrangement.

FIG. 1 shows a pair of adjacent permanent magnet poles 1a, 1b, each pole comprising a central, main, high energy-product magnet 2a, 2b, and, to either side of the magnet 2a, 2b, side, subsidiary, low energy-product magnets 3a, 3b, 3c, 3d. Each pole 1a, 1b has a base 4a, 4b, top face 5a, 5b, and sides 6a, 6b, 6c, 6d. The arrows on the magnets 2a, 2b, 3a, 3b, 3c, 3d represent the direction of magnetization of the magnets. Each magnet 2a, 3a, 3b of pole 1a has a direction of magnetization directed perpendicularly away from the base 4a of the pole. Each magnet 2b, 3c, 3d of adjacent pole 1b has a direction of magnetization directed perpendicularly towards the base 4b of the pole.

The pair of adjacent poles 1a, 1b produces a magnetic field having a flux density distribution as shown. For each pole 1a, 1b, the distribution has a central, main region 2a', 2b' of relatively high flux density corresponding to the stronger high energy-product magnet 2a, 2b of the pole, and side, subsidiary regions 3a', 3b', 3c', 3d' of relatively low flux density corresponding respectively to the weaker low energy-product magnets 3a, 3b, 3c, 3d of the pole.

SUMMARY OF INVENTION

It can be seen that the permanent magnet arrangement of FIG. 1 has a flux density distribution that only poorly approximates a sinusoid. This is disadvantageous as it can give rise to appreciable cogging torque and torque ripple on load when the arrangement is in use in a synchronous permanent magnet machine. The arrangement also has the disadvantage that the weaker low energy-product magnets 3a, 3b, 3c, 3d are relatively poor at withstanding demagnetization when the arrangement is in use in a synchronous permanent magnet machine.

A synchronous permanent magnet machine is provided which includes a permanent magnet arrangement for producing a magnetic field having a flux density distribution that is approximately sinusoidal, the permanent magnet arrangement including a permanent magnet pole having a base, top face, sides, and a central region midway between the sides and extending between the base and top face, the permanent magnet pole being made up of both low and high energy-product magnets, wherein
  (i) the permanent magnet pole includes a low energy-product magnet and a high energy-product magnet that have different directions of magnetization, and/or
  (ii) a disposition of low energy-product magnets within the permanent magnet pole is asymmetric with respect to the central region of the permanent magnet pole.

BRIEF DESCRIPTION OF THE DRAWINGS

FIG. 1 also shows schematically the flux density distribution of the magnetic field produced by the arrangement.

FIGS. 2 to 13 show respectively first to twelfth permanent magnet arrangements for use in a synchronous permanent magnet machine. FIGS. 2 to 13 also show schematically the flux density distributions of the magnetic fields produced by arrangements.

FIGS. 14 and 15 show respectively first and second synchronous permanent magnet machines in which the permanent magnet arrangements of FIGS. 2 to 13 might be used.

DETAILED DESCRIPTION OF INVENTION

Figure 2:
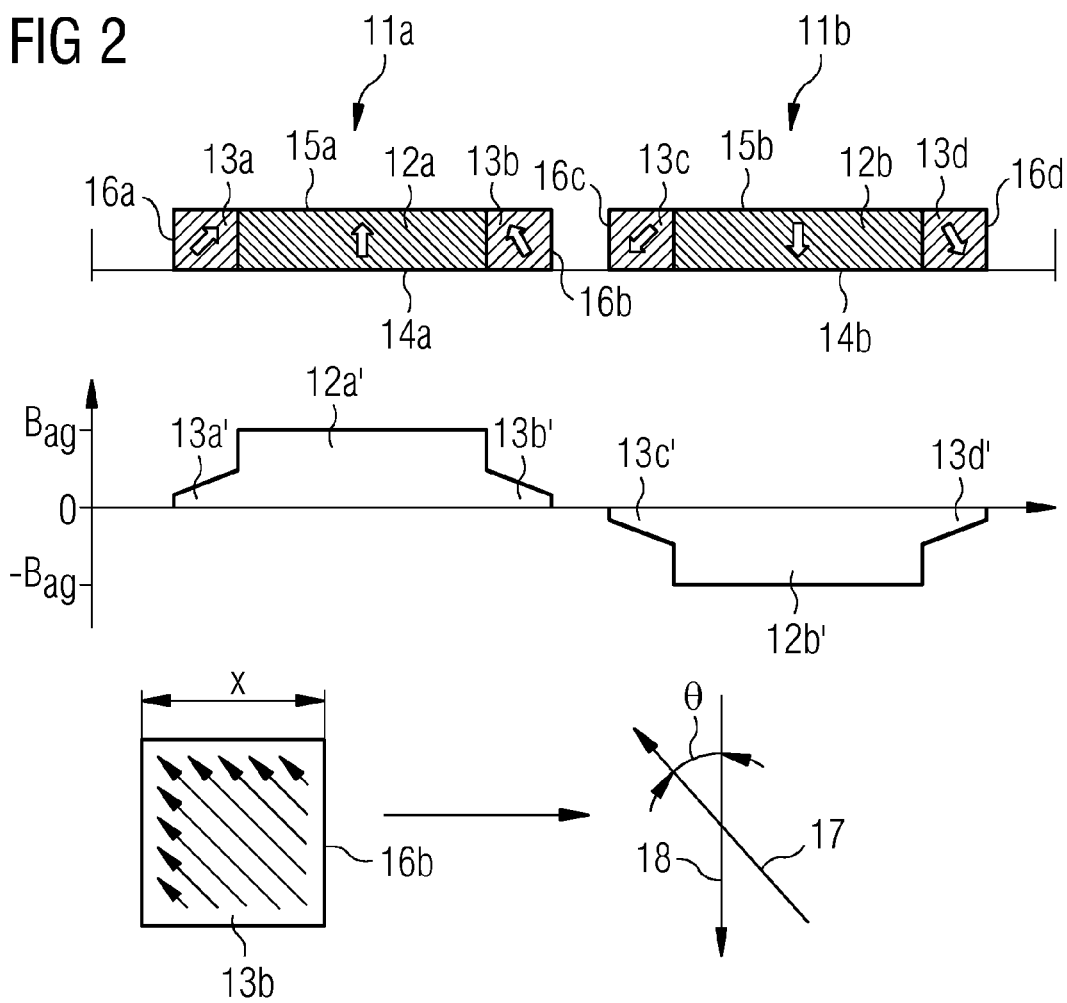

FIG. 2 shows a pair of adjacent permanent magnet poles 11a, 11b, each pole comprising a central, main, high energy-product magnet 12a, 12b, and, to either side of the magnet 12a, 12b, side, subsidiary, low energy-product magnets 13a, 13b, 13c, 13d. Each pole 11a, 11b has a base 14a, 14b, top face 15a, 15b, and sides 16a, 16b, 16c, 16d. The arrows on the magnets 12a, 12b, 13a, 13b, 13c, 13d represent the direction of magnetization of the magnets. The high energy-product magnet 12a of pole 11a has a direction of magnetization directed perpendicularly away from the base 14a of the pole. The low energy-product magnets 13a, 13b of pole 11a have directions of magnetization directed away from the base 14a of the pole and towards the high energy-product magnet 12a of the pole. The high energy-product magnet 12b of adjacent pole 11b has a direction of magnetization directed perpendicularly towards the base 14b of the pole. The low energy-product magnets 13c, 13d of pole 11b have directions of magnetization directed towards the base 14b of the pole and away from the high energy-product magnet 12b of the pole.

The pair of adjacent poles 11a, 11b produces a magnetic field having a flux density distribution as shown. For each pole 11a, 11b, the distribution has a central, main region 12a', 12b' of relatively high flux density corresponding to the stronger high energy-product magnet 12a, 12b of the pole, and side, subsidiary regions 13a', 13b', 13c', 13d' of relatively low flux density corresponding respectively to the weaker low energy-product magnets 13a, 13b, 13c, 13d of the pole.

Figure 1:
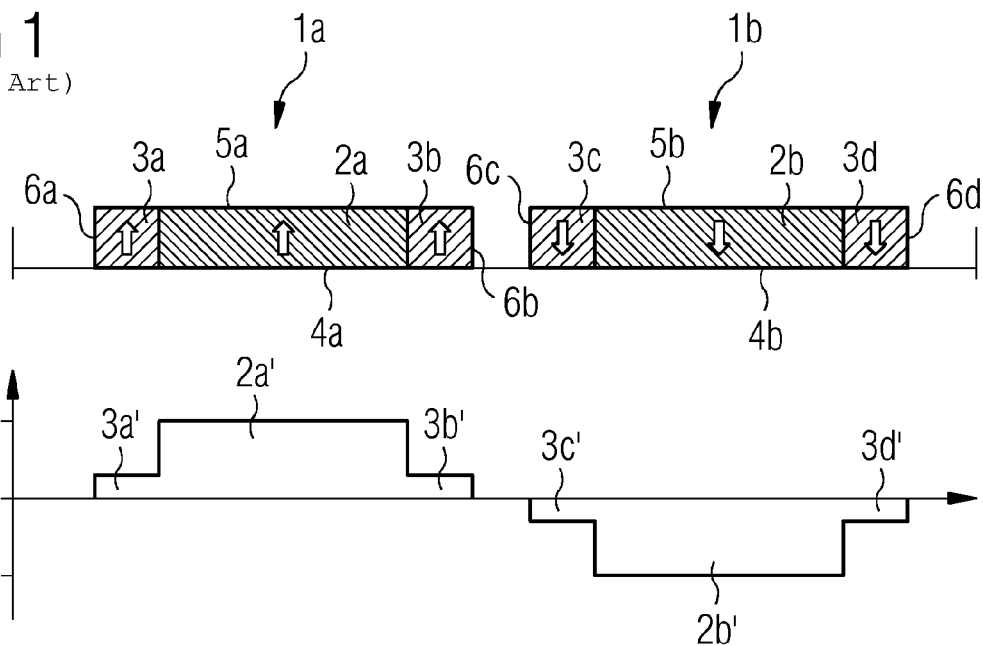
FIG. 1, already referred to, shows a known permanent magnet arrangement for use in a synchronous permanent magnet machine.

Comparison of the flux density distribution of the permanent magnet arrangement of FIG. 2 with that of the permanent magnet arrangement of FIG. 1 shows that the arrangement of FIG. 2 more closely approximates a sinusoid than the arrangement of FIG. 1. This is due to the direction of magnetization of the low energy-product magnets 13a, 13b, 13c, 13d of the arrangement of FIG. 2.

FIG. 2 includes a sub-figure showing in greater detail the magnetization of the low energy-product magnet 13b of pole 11a of FIG. 2. The flux density at any selected position across the width 'x' of magnet 13b is determined by the length of the arrow within the magnet that is directed to the selected position. The arrows within the magnet directed to the width x progressively increase in length from the right side of width x to the left side of width x. Thus, the flux density increases from the right side to the left side of low energy-product magnet 13b of pole 11a of FIG. 2. This can be seen in the flux density distribution shown in FIG. 2. Corresponding explanations apply in respect of the remaining low energy-product magnets 13a, 13c, 13d of FIG. 2.

FIG. 2 includes a further sub-figure showing two arrows 17, 18 which subtend an angle theta relative to one another. Arrow 17 represents the direction of magnetization of low energy-product magnet 13b of pole 11a of FIG. 2. Arrow 18 represents a magnetic field to which the magnet 13b might typically be subject in use of the permanent magnet arrangement of FIG. 2 in a synchronous permanent magnet machine (further on this below). The direction of the magnetic field 18 is perpendicularly towards the top face of magnet 13b.

It can be seen that the component of the magnetic field 18 that acts against the magnetization 17 is the magnetic field 18 multiplied by cosine theta, i.e. the component of the magnetic field 18 that acts to demagnetize the magnet 13b is the magnetic field 18 times cosine theta. This is to be contrasted to the case of the low energy-product magnet 3b of pole 1a of FIG. 1, when subject to the same magnetic field. In this case the entire magnetic field, not just a component of the magnetic field, acts to demagnetize the magnet 3b, as the direction of the magnetic field is directly opposite to the direction of magnetization of the magnet 3b. Thus, the magnet 13b of pole 11a of FIG. 2 is better at withstanding the demagnetization than the magnet 3b of pole 1a of FIG. 1. Corresponding explanations apply in respect of the remaining low energy-product magnets 13a, 13c, 13d of FIG. 2.

The permanent magnet arrangement of FIG. 3 differs from that of FIG. 2 in that further low energy-product magnets 19a, 19b, 19c have been added: magnet 19a to the left of magnet 13a, magnet 19b between magnets 13b and 13c, and magnet 19c to the right of magnet 13d. The magnets 19a, 19b, 19c have directions of magnetization as follows: magnet 19a directly towards high energy-product magnet 12a, magnet 19b directly away from high energy-product magnet 12b and, directly towards magnet 12a, and magnet 19c directly away from magnet 12b. FIG. 3 shows a pair of adjacent permanent magnet poles 21a, 21b having an extent as shown in the figure, i.e. pole 21a extends from midway across the width of magnet 19a to midway across the width of magnet 19b, and pole 21b extends from midway across the width of magnet 19b to midway across the width of magnet 19c. Thus, pole 21a can be considered to have a left side midway across the width of magnet 19a and a right side midway across the width of magnet 19b, and pole 21b can be considered to have a left side midway across the width of magnet 19b and a right side midway across the width of magnet 19c. The permanent magnet arrangement of FIG. 3 produces a magnetic field having a flux density distribution as shown. The magnets 19a, 19b, 19c are virtually immune to demagnetization by a magnetic field directed perpendicularly towards their top faces. A variation on the permanent magnet arrangement of FIG. 3 would be to remove magnets 13a, 13b, 13c, 13d, and extend magnets 19a, 19b, 19c to occupy the spaces left by magnets 13a, 13b, 13c, 13d.

The permanent magnet arrangement of FIG. 4 differs from that of FIG. 3 in that: the low energy-product magnets 13a, 19a have been replaced by a single low energy-product magnet 22a, the low energy-product magnets 13b, 13c, 19b have been replaced by a single low energy-product magnet 22b, and the low energy-product magnets 13d, 19c have been replaced by a single low energy-product magnet 22c. The directions of magnetization of the magnets 22a, 22b, 22c are as follows: magnet 22a initially directly towards high energy-product magnet 12a, progressively turning to ultimately perpendicularly away from the base of magnet 22a; magnet 22b initially directly towards the base of magnet 22b, progressively turning to directly away from high energy-product magnet 12b and directly towards magnet 12a, progressively turning to ultimately perpendicularly away from the base of magnet 22b; and magnet 22c initially perpendicularly towards the base of magnet 22c, progressively turning to ultimately directly away from magnet 12b. FIG. 4 shows a pair of adjacent permanent magnet poles 23a, 23b having an extent as shown in the figure. Note, the right side of pole 23a and the left side of pole 23b are both midway across the width of magnet 22b.

The permanent magnet arrangement of FIG. 5 is the same as that of FIG. 1 except that: the high energy-product magnet 2a and the low energy-product magnet 3b have been replaced by a single high energy-product magnet 24a, and, similarly, the high energy-product magnet 2b and the low energy-product magnet 3d have been replaced by a single high energy-product magnet 24b. Although this means that the flux density distribution of the arrangement of FIG. 5 no longer so closely approximates a sinusoid, it does improve the demagnetization withstand of the arrangement in the regions of low energy-product magnets 3b, 3d. It can be important to improve the demagnetization withstand in these regions (more on this below).

The permanent magnet arrangement of FIG. 6 is the same as that of FIG. 5 except that the right sides of the high energy-product magnets 24a, 24b have been shaped to reproduce the flux density distribution of the permanent magnet arrangement of FIG. 1. Thus, the arrangement of FIG. 6 has the same flux density distribution as the arrangement of FIG. 1, but an improved demagnetization withstand in the regions of low energy-product magnets 3b, 3d.

Figure 7:
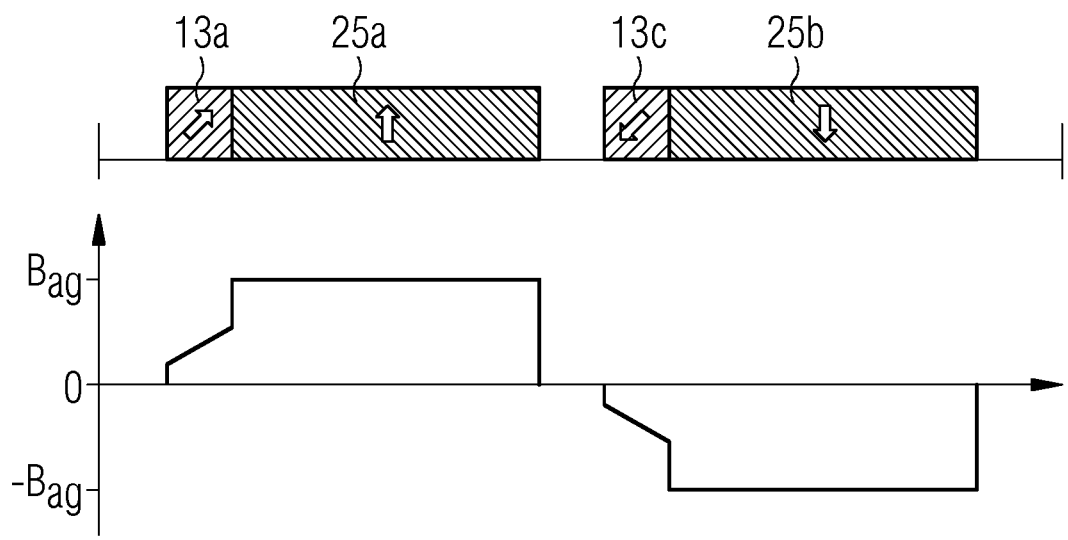

The permanent magnet arrangement of FIG. 7 is the same as that of FIG. 2 except that: the high energy-product magnet 12a and the low energy-product magnet 13b have been replaced by a single high energy-product magnet 25a, and, similarly, the high energy-product magnet 12b and the low energy-product magnet 13d have been replaced by a single high energy-product magnet 25b. The directions of magnetization of the magnets 25a, 25b are as follows: magnet 25a perpendicularly away from the base of magnet 25a, and magnet 25b perpendicularly towards the base of magnet 25b. Although the flux density distribution of the arrangement of FIG. 7 no longer so closely approximates a sinusoid, the arrangement does have an improved demagnetization withstand in the regions of low energy-product magnets 13b, 13d.

Figure 8:
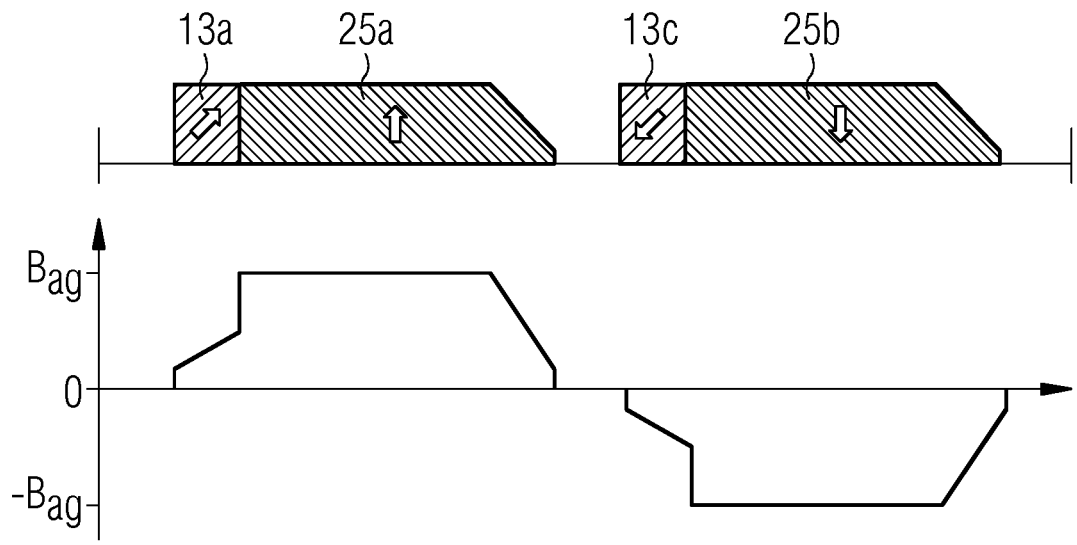

The permanent magnet arrangement of FIG. 8 is the same as that of FIG. 7 except that the right sides of the high energy-product magnets 25a, 25b have been shaped to improve the flux density distribution of the arrangement.

The permanent magnet arrangement of FIG. 9 is the same as that of FIG. 8 except that the right sides of the high energy-product magnets 25a, 25b have been further shaped to improve further the flux density distribution of the arrangement. The result of the further shaping is a flux density distribution the same as that of the permanent magnet arrangement of FIG. 2.

The permanent magnet arrangement of FIG. 10 is the same as that of FIG. 7 except that: a further low energy-product magnet 26a has been added to the left of the low energy-product magnet 13a, and a further low energy-product magnet 26b has been added to the left of the low energy-product magnet 13c. The directions of magnetization of the magnets 26a, 26b are as follows: magnet 26a directly towards high energy-product magnet 25a, and magnet 26b directly away from high energy-product magnet 25b. The result of adding the magnets 26a, 26b is an improved flux density distribution of the left side of each permanent magnet pole of FIG. 10.

Figure 11:
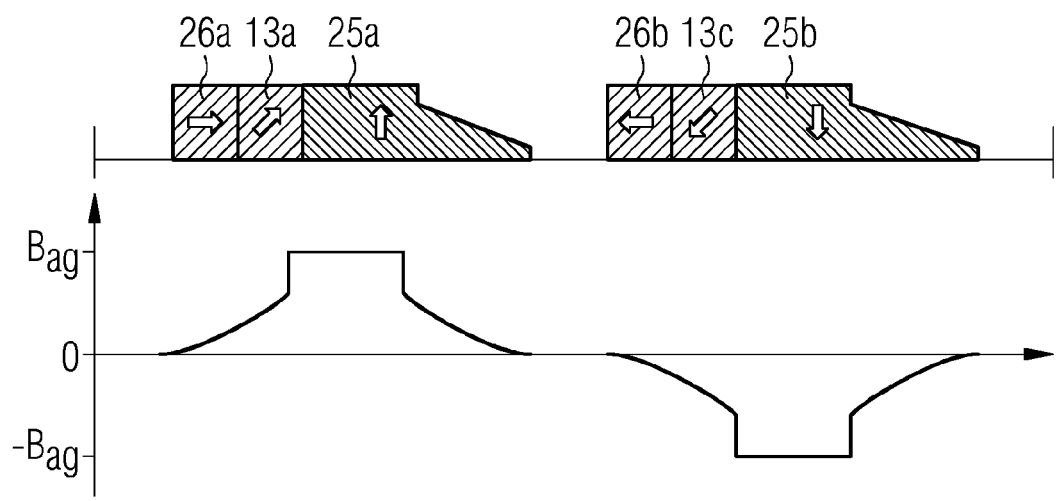

The permanent magnet arrangement of FIG. 11 is the same as that of FIG. 10 except that the right sides of the high energy-product magnets 25a, 25b have been shaped so that the flux density distribution of the right side of each permanent magnet pole of FIG. 11 matches that of the left side.

Figure 12:
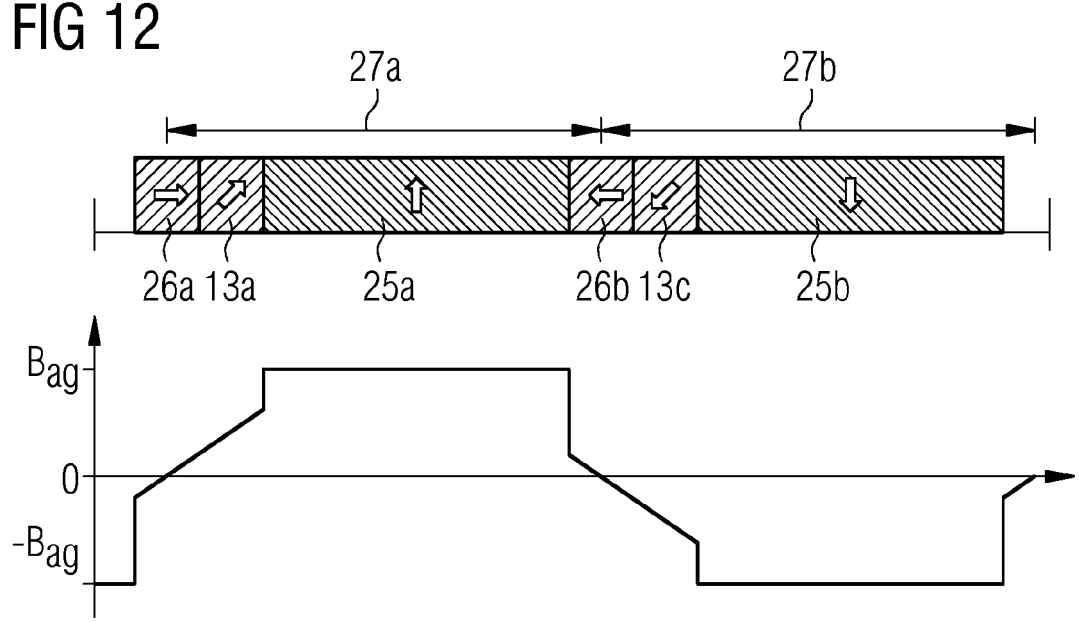

The permanent magnet arrangement of FIG. 12 is the same as that of FIG. 10 except that the gap between the high energy-product magnet 25a and the low energy-product magnet 26b has been reduced to zero. FIG. 12 shows a pair of adjacent permanent magnet poles 27a, 27b having an extent as shown in the figure. Note, the right side of pole 27a and the left side of pole 27b are both midway across the width of magnet 26b.

Figure 13:
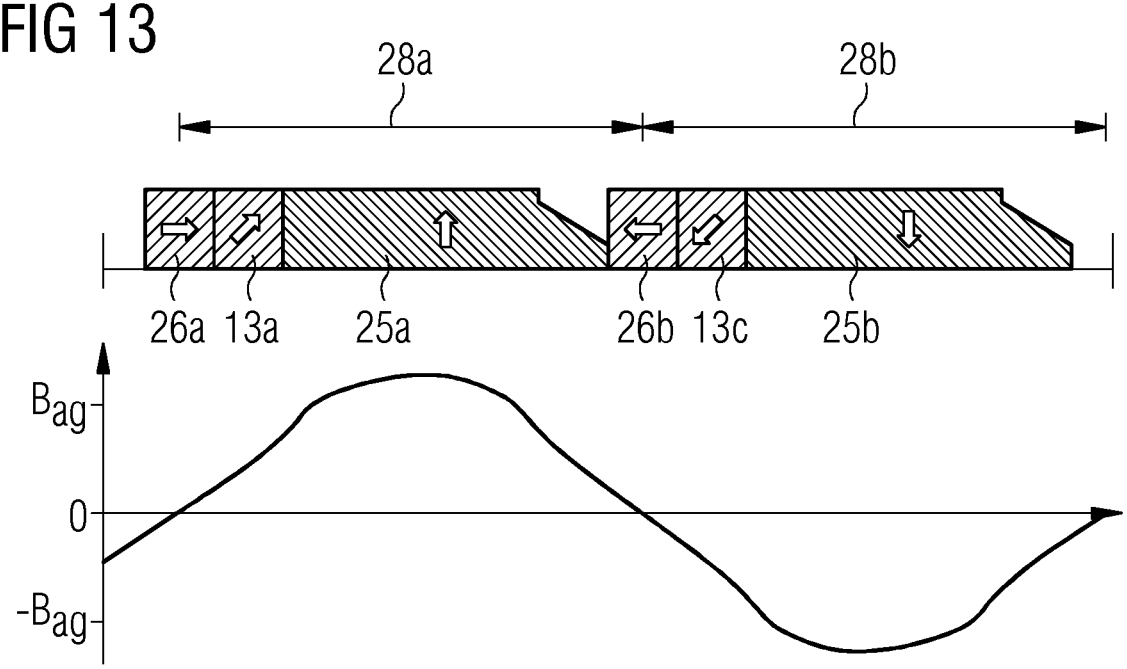

The permanent magnet arrangement of FIG. 13 is the same as that of FIG. 12 except that the right sides of the high energy-product magnets 25a, 25b have been shaped. This shaping is the same as that of magnets 25a, 25b in FIG. 9. FIG. 13 shows a pair of adjacent permanent magnet poles 28a, 28b having an extent as shown in the figure. Note, the right side of pole 28a and the left side of pole 28b are both midway across the width of magnet 26b.

The permanent magnet arrangements of FIGS. 2 to 13 may be used in synchronous permanent magnet machines that are internal or external rotor, are rotary or linear, are radial or axial field, are slotted or slotless, and have various winding layouts.

The first synchronous permanent magnet machine of FIG. 14 is of the rotary type and comprises a rotor 31 and a stator 32. On the rotor is mounted a permanent magnet arrangement as the permanent magnet arrangements of FIGS. 2 to 13. The arrangement comprises two oppositely disposed poles 33a, 33b of positive polarity, and two oppositely disposed poles 33c, 33d of negative polarity. The poles 33a, 33b and the poles 33c, 33d are disposed at 90 degrees relative to one another about the axis of rotation A of the rotor (which is into and out of the paper in FIG. 14). On the stator are mounted windings 34 (the conductors of the windings run into and out of the paper in FIG. 14). In operation of the synchronous permanent magnet machine, the rotor 31 rotates within the stator 32.

The sub-figure of FIG. 14 shows positive and negative rectangular profiles 35, 36 which represent respectively the magnetization of the positive poles 33a, 33b and the negative poles 33c, 33d. Above profiles 35, 36 are shown respectively negative-gradient and positive-gradient ramp profiles 37, 38. Profiles 37, 38 represent the magnetic field, as produced by the windings 34, experienced respectively by the positive and negative poles, in operation of the synchronous permanent magnet machine.

It can be seen that the right sides of both the positive and negative poles are subject to demagnetization by the magnetic field produced by the windings 34, whereas the reverse is the case for the left sides of the poles, which have their magnetization reinforced. It is for this reason that in the permanent magnet arrangements of FIGS. 5 to 13 a high energy-product magnet is to be found to the right side of both the positive and negative poles. Note, in the arrangements of FIGS. 12 and 13 a low energy-product magnet is to be found to the extreme right of the poles but this is of no consequence as the direction of magnetization of the low energy-product magnet is perpendicular to the applied magnetic field. Further note, if the direction of rotation of the rotor 31 is reversed, then the permanent magnet arrangements of FIGS. 5 to 13 should also be reversed, i.e. the high energy-product magnet of the preceding sentence but one will now be found to the left side, not the right side, of both the positive and negative poles.

Figure 15:
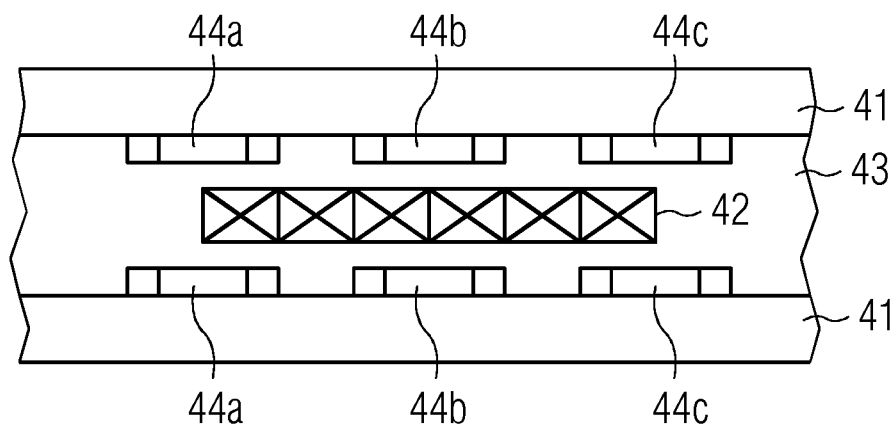

The second synchronous permanent magnet machine of FIG. 15 is of the linear type and comprises parallel elongate mountings 41, windings 42 disposed midway between the mountings in the channel 43 between the mountings, and, mounted on each of the mountings between the mounting and the windings, a permanent magnet arrangement as the permanent magnet arrangements of FIGS. 2 to 13. Each arrangement comprises a linear array of poles 44a, 44b, 44c, with adjacent poles being of opposite polarity. The conductors of the windings extend into and out of the paper in FIG. 15. In operation of the synchronous permanent magnet machine, there is relative movement horizontally in FIG. 15 between the mountings 41 (together with their poles 44a, 44b, 44c) and the windings 42.

The invention claimed is:

1. A synchronous permanent magnet machine, comprising:
    a permanent magnet arrangement for producing a magnetic field having a flux density distribution that is approximately sinusoidal, the permanent magnet arrangement comprising:
    a permanent magnet pole comprising both low and high energy-product magnets, wherein
    (i) the permanent magnet pole includes a low energy-product magnet and a high energy-product magnet that have different directions of magnetization, or
    (ii) a disposition of low/high energy-product magnets within the permanent magnet pole is asymmetric with respect to a central region of the permanent magnet pole, and
    wherein the main high energy-product magnet has been shaped so that a height of the main high energy-product magnet remote from the side low energy-product magnet is reduced as compared to a height of the main high energy-product magnet adjacent to the side low energy-product magnet.

2. The synchronous permanent magnet machine according to claim 1,
    wherein the disposition of low/high energy-product magnets within the permanent magnet pole is symmetric with respect to the central region of the permanent magnet pole, and
    wherein the permanent magnet pole comprises a central high energy-product magnet and side low energy-product magnets disposed to either side of the central high energy-product magnet.

3. The synchronous permanent magnet machine according to claim 2,
    wherein the central high energy-product magnet has a direction of magnetization perpendicularly towards/away from a base of the permanent magnet pole, and
    wherein the side low energy-product magnets have directions of magnetization towards/away from the base of the permanent magnet pole and away from/towards the central high energy-product magnet.

4. The synchronous permanent magnet machine according to claim 2,
- wherein the central high energy-product magnet has a direction of magnetization perpendicularly towards/away from a base of the permanent magnet pole, and
- wherein the side low energy-product magnets each comprise first and second side low energy-product magnets,
  - the first side low energy-product magnets being disposed nearer the central high energy-product magnet than the second side low energy-product magnets,
  - the first side low energy-product magnets having directions of magnetization towards/away from the base of the permanent magnet pole and away from/towards the central high energy-product magnet,
  - the second side low energy-product magnets having directions of magnetization directly towards/away from the central high energy-product magnet.

5. The synchronous permanent magnet machine according to claim 2,
- wherein the central high energy-product magnet has a direction of magnetization perpendicularly towards/away from a base of the permanent magnet pole, and
- wherein the side low energy-product magnets have directions of magnetization either
  - initially directly towards the central high energy-product magnet and progressively turning to ultimately perpendicularly away from the base of the permanent magnet pole, or
  - initially directly towards the base of the permanent magnet pole and progressively turning to ultimately perpendicularly away from the central high energy-product magnet.

6. The synchronous permanent magnet machine according to claim 1,
- wherein the disposition of low/high energy-product magnets within the permanent magnet pole is asymmetric with respect to the central region of the permanent magnet pole, and
- wherein the permanent magnet pole comprises a main high energy-product magnet and a side low energy-product magnet disposed to one side of the main high energy-product magnet.

7. The synchronous permanent magnet machine according to claim 6,
- wherein the main high energy-product magnet has a direction of magnetization perpendicularly towards/away from a base of the permanent magnet pole, and
- wherein the side low energy-product magnet has a direction of magnetization perpendicularly towards/away from the base of the permanent magnet pole.

8. The synchronous permanent magnet machine according to claim 6,
- wherein the main high energy-product magnet has a direction of magnetization perpendicularly towards/away from a base of the permanent magnet pole, and
- wherein the side low energy-product magnet has a direction of magnetization towards/away from the base of the permanent magnet pole and away from/towards the main high energy-product magnet.

9. The synchronous permanent magnet machine according to claim 6,
- wherein the side low energy-product magnet comprises first and second side low energy-product magnets,
  - the first side low energy-product magnet being disposed nearer the main high energy-product magnet than the second side low energy-product magnet,
  - the first side low energy-product magnet having a direction of magnetization towards/away from a base of the permanent magnet pole and away from/towards the main high energy-product magnet,
  - the second side low energy-product magnet having a direction of magnetization directly towards/away from the main high energy-product magnet.

10. The synchronous permanent magnet machine according to claim 9, further comprising:
- a further side low energy-product magnet disposed on the other side of the main high energy-product magnet to the first and second side low energy-product magnets, the further side low energy-product magnet having a direction of magnetization directly towards/away from the main high energy-product magnet.

* * * * *